United States Patent
Casati

(10) Patent No.: US 12,418,807 B2
(45) Date of Patent: Sep. 16, 2025

(54) MOBILE SELF-BACKHAULING WIRELESS ACCESS NODE

(71) Applicant: Nokia Technologies Oy, Espoo (FI)

(72) Inventor: Alessio Casati, West Molesey (GB)

(73) Assignee: Nokia Technologies Oy, Espoo (FI)

( * ) Notice: Subject to any disclaimer, the term of this patent is extended or adjusted under 35 U.S.C. 154(b) by 274 days.

(21) Appl. No.: 18/026,626

(22) PCT Filed: Sep. 22, 2020

(86) PCT No.: PCT/EP2020/076400
§ 371 (c)(1),
(2) Date: Mar. 16, 2023

(87) PCT Pub. No.: WO2022/063388
PCT Pub. Date: Mar. 31, 2022

(65) Prior Publication Data
US 2023/0345266 A1    Oct. 26, 2023

(51) Int. Cl.
*H04W 24/00* (2009.01)
*H04W 24/02* (2009.01)
(Continued)

(52) U.S. Cl.
CPC ......... *H04W 24/02* (2013.01); *H04W 72/231* (2023.01); *H04W 84/005* (2013.01); *H04W 84/047* (2013.01)

(58) Field of Classification Search
None
See application file for complete search history.

(56) References Cited

U.S. PATENT DOCUMENTS

2020/0022054 A1*  1/2020  Hong .................... H04W 24/04
2020/0084819 A1*  3/2020  Abedini ................ H04W 76/15
(Continued)

FOREIGN PATENT DOCUMENTS

WO   WO 2013/025166 A1   2/2013
WO   WO 2013/025168 A1   2/2013
(Continued)

OTHER PUBLICATIONS

Anna Lukowa, Dynamic Self-Backhauling in 5G Networks, published 2018 all pages (Year: 2018).*
(Continued)

*Primary Examiner* — Brandon M Renner
(74) *Attorney, Agent, or Firm* — Barta Jones, PLLC

(57) ABSTRACT

There is provided support for mobile self-backhauling wireless access nodes. A method includes receiving a radio interface control plane message for establishing a radio resource control connection, determining that the received radio interface control plane message includes information indicating that the received radio interface control plane message originates from a mobile self-backhauling wireless access node, determining a controller node configured to: serve for a centralized unit of distributed units of different radio access nodes, and connect to distributed units deployed to a plurality of service areas of the radio access network. A radio resource control connection of the mobile self-backhauling wireless access node is caused to terminate at the determined controller node.

16 Claims, 14 Drawing Sheets

---

302 receiving a radio interface control plane message 304 determining that the received radio interface control plane message includes information indicating that the received radio interface control plane message originates from a mobile self-backhauling wireless access node 306 determining a controller node 308 causing to terminate a radio resource control connection of the mobile self-backhauling wireless access node at the determined controller node

(51) Int. Cl.
*H04W 72/231* (2023.01)
*H04W 84/00* (2009.01)
*H04W 84/04* (2009.01)

(56) References Cited

U.S. PATENT DOCUMENTS

| | | | | |
|---|---|---|---|---|
| 2020/0413292 | A1* | 12/2020 | Liu | H04W 28/0215 |
| 2022/0132455 | A1* | 4/2022 | Gupta | H04W 60/00 |
| 2022/0167331 | A1* | 5/2022 | Huang | H04W 28/16 |
| 2022/0248495 | A1* | 8/2022 | Mildh | H04W 76/11 |
| 2022/0322464 | A1* | 10/2022 | Luo | H04W 36/0064 |
| 2023/0309154 | A1* | 9/2023 | Kurita | H04L 5/0044 |

FOREIGN PATENT DOCUMENTS

| | | | | |
|---|---|---|---|---|
| WO | WO-2020149653 | A1 * | 7/2020 | H04W 72/04 |
| WO | WO-2020222196 | A1 * | 11/2020 | H04W 76/11 |

OTHER PUBLICATIONS

ZTE et al., "Views on Rel-17 IAB," 3GPP TSG RAN Meeting #86, RP-192577, Sitges, Spain, Dec. 9-12, 2019.
LG Electronics Inc., "Consideration on IAB Node Migration for Mobile Scenarios," 3GPP TSG-RAN WG3 Meeting #109-e, R3-205063, Aug. 17-28, 2020.
"3rd Generation Partnership Project; Technical Specification Group Radio Access Network; NR; Study on Integrated Access and Backhaul; (Release 16)," 3GPP TR 38.874 V16.0.0 (Dec. 2018), Retrieved on Jan. 11, 2019.

* cited by examiner 502 causing establishment of one or more mobile backhaul channels with the controller node for serving both control plane and user plane traffic to/from the mobile self-backhauling wireless access node at the controller node.

Fig. 5

602 receiving a configuration for controlling the distributed unit by the controller node

Fig. 6

702 receiving from a management system, information indicating one or more groups of self-backhauling wireless access nodes;

704 determining that the received radio interface control plane message includes information indicating a group membership of the mobile self-backhauling wireless access node 706 determining the controller node from at least two controller nodes that are configured to control different groups of self-backhauling wireless access nodes, on the basis of the group membership of the mobile self-backhauling wireless access node.

Fig. 7

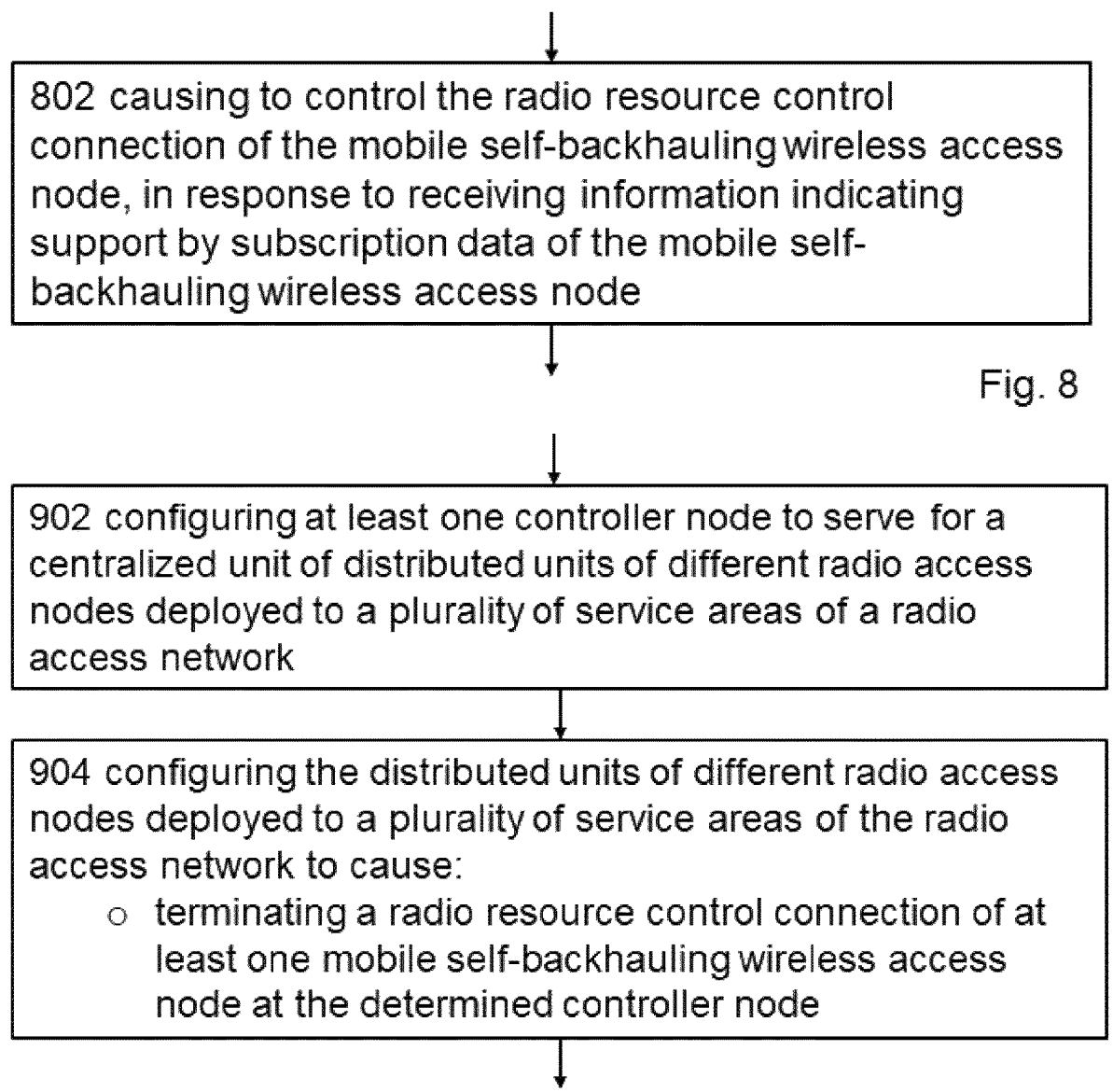

1002 configuring, by the management system, the distributed units of different radio access nodes deployed to a plurality of service areas of the radio access network, to cause: establishing backhaul channels between the distributed units of different radio access nodes and the controller node for serving both control plane and user plane traffic to/from the at least one mobile self-backhauling wireless access node at the controller node

Fig. 10

1102 assigning, by the management system, to the at least one controller node one or more one or more identifiers for identifying service areas dedicated for mobile self-backhauling wireless access nodes

Fig. 11

1202 configuring, by the management system, the distributed units of different radio access nodes deployed to a plurality of service areas of the radio access network, to cause terminating, the radio resource control connection of the at least one mobile self-backhauling wireless access node at the at least one controller node on the basis of a group membership of the at least one mobile self-backhauling wireless access node

Fig. 12

1302 configuring by the management system, the distributed units of different radio access nodes deployed to a plurality of service areas of the radio access network, to cause terminating, the radio resource control connection, at the at least one controller node, in response to receiving a radio interface control plane message for establishing a radio resource control connection, wherein the received radio resource control connection message includes information indicating that the received radio resource control connection message originates from the at least one mobile self-backhauling wireless access node

Fig. 13

MOBILE SELF-BACKHAULING WIRELESS ACCESS NODE

CROSS REFERENCE TO RELATED APPLICATION

This patent application is a U.S. National Stage application of International Patent Application Number PCT/EP2020/076400 filed Sep. 22, 2020, which is hereby incorporated by reference in its entirety.

TECHNICAL FIELD

The present invention relates to mobile wireless self-backhauling wireless access nodes.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Integrated Access and Backhaul (IAB) is a wireless backhaul and access technology introduced by 5G New Radio (NR). In 5G NR a gNB may be split into one central unit (CU) and one or more distributed units (DUs). The CU hosts higher layer radio interface protocols to User Equipment (UE) and terminates a control plane and user plane interfaces to 5G core (5GC). The CU controls the DUs over F1 interface(s), where the DU node hosts lower layers of the radio interface protocols.

UE connected to a network over an IAB-node can experience mobility even if the UE would stay connected to the IAB-node, if a wireless backhaul of the IAB-node towards an IAB donor changes or the UE is moved outside of the coverage area of the IAB-node. For example, the IAB-node can be deployed on a moving vehicle and the UE onboard the vehicle is connected to the IAB-node. Then, as the vehicle moves the wireless backhaul changes and the UE can experience handovers and tracking area changes. On the other hand, if the IAB-node is deployed on a vehicle, for example on a train, and the UE is stationary, for example on a platform, the UE can be within the coverage area of the IAB-node and connected to the IAB-node, when the train is stopped at the platform. However, the UE is moved outside of the coverage area of the IAB-node, when the train starts moving and the UE stays at the platform.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which:

FIGS. 3 to 14 illustrates examples of methods in accordance with at least some embodiments of the present invention;

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
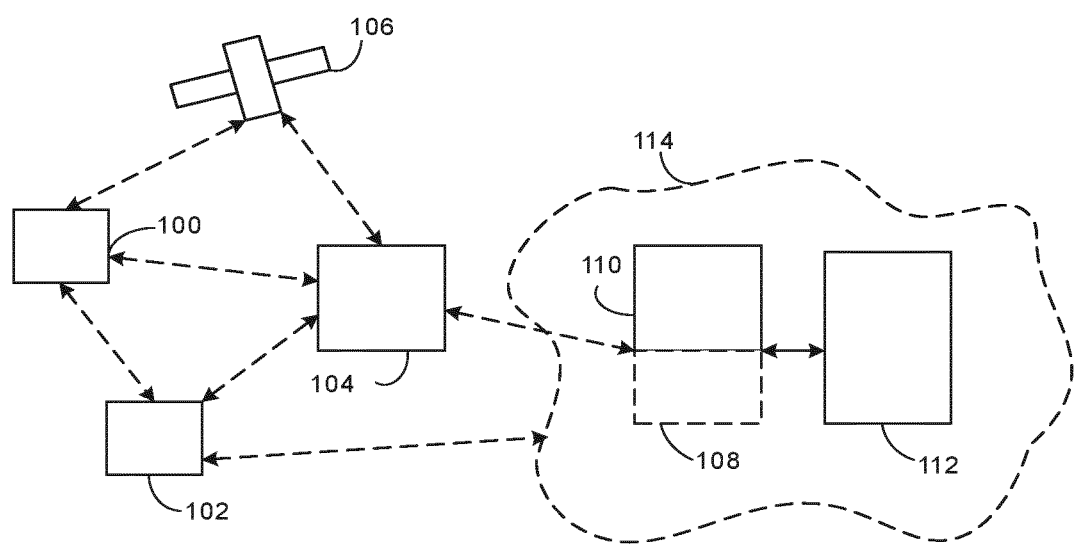
FIG. 1 shows a part of an exemplifying wireless communications access network in accordance with at least some embodiments of the present invention.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network, RAN, may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN; 5G core, 5GC; or next generation core, NGC). Depending on the system, the counterpart on the CN side can be a serving gateway (S-GW, routing and forwarding user data packets), packet data network gateway (P-GW), for providing connectivity of user devices (UEs) to external packet data networks, mobile management entity (MME), Access and Mobility Management Function (AMF), or User Plane Function (UPF), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the Long-Term Evolution (LTE). Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or NodeB (gNB). It should be appreciated that MEG can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Horne(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocelis. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)NodeBs), a home node B gateway, or HNB-GW (not shown in FIG. 1). An HNB Gateway (HNB-GW), which is typically installed within an operator's network may aggregate traffic from a large number of HNBs back to a core network.

The embodiments are not, however, restricted to the system given as an example but a person skilled in the art may apply the solution to other communication systems provided with necessary properties.

In the following, examples in accordance with at least some embodiments are described with reference to the 3rd Generation Partnership Project NG-RAN Architecture description described in 3GPP TS 38.401 V16.2.0 (2020-07) and the Radio access architecture and interfaces described in 3GPP TR 38.801 V14.0.0 (2017-03). In this context, examples of self-backhauling wireless access nodes are referred to IAB-nodes and examples of radio access nodes configured to support self-backhauling wireless access nodes are referred to IAB-donors. The IAB donors are gNBs that may serve as backhaul for surrounding gNB(s), e.g. IAB-nodes. In this way backhauls of surrounding IAB-nodes may be provided by wireless backhaul connections to the IAB donor. The IAB-nodes and the IAB-donors may be deployed using a split architecture, where processing of a radio protocol stack is split between a controller node, e.g. a centralized unit (IAB-CU), and distributed units (DUs), e.g. IAB-DUs. The controller node may be configured to serve for a centralized unit of distributed units of different radio access nodes and connect to distributed units deployed to a plurality of service areas of a radio access network. The split architecture provides distribution of processing between the IAB-CU and the IAB-DUs. The IAB-CU may be configured to process higher layer protocols and the IAB-DUs may be configured to process lower layer protocols. Mobile self-backhauling wireless access nodes, e.g. Mobile IAB-nodes, may refer to IAB-nodes deployed on a platform configured to be movable between service areas of a radio access network. Examples of the service areas comprise services areas that are associated with, e.g. fixed to, a geographical location. Examples of the service areas comprise cells and tracking areas that may be configured by an Operations, Administration and Management (OAM) system to be associated with a geographical location. A tracking area may be configured by a tracking area code (TAC). A TAC is a unique code that an operator may assign to each tracking area. A Tracking Area Identifier (TAI) may comprise a Public Land Mobile Network Identifier (PLMN ID) and a TAC. A cell may be identified by a Physical Cell Identifier (PCI). A PCI may be determined by UE on the basis of system information received from a radio access network, for example from an IAB-node or gNB. The system information may comprise synchronization signal that may be used by the UE to deduce the PCI. The synchronization signals may comprise a Primary Synchronization Signal (PSS) and a Secondary Synchronization Signal (SSS). The service areas, e.g. the TAC and PCI, may be configured to the gNB, IAB-nodes and mobile IAB-nodes by the OAM system. Examples of the platforms comprise vehicles such as at least one of road vehicles, vehicles running on rails, and aquatic vehicles, where the Mobile IAB-nodes may be deployed to provide wireless access to UE onboard the vehicles. Examples of the road vehicles comprise buses and trains. Vehicles, where wireless access provided by Mobile IAB-nodes may be particularly beneficial comprise vehicles for public transportation, where a number UEs onboard each vehicle may be high and the vehicles have pre-defined routes. A Mobile-IAB CU refers to an IAB-CU dedicated to Mobile IAB-nodes. The Mobile-IAB CU supports movement of the Mobile IAB-nodes between service areas of the radio access network, whereby mobility experienced by UE served by the Mobile IAB-nodes may be significantly reduced and even avoided. Movement of Mobile IAB-nodes between service areas of DUs controlled by the same Mobile-IAB CU can be supported using procedures, e.g. intra-gNB procedures, between the Mobile-IAB CU and DUs controlled by the Mobile-IAB CU. Therefore, the Mobile IAB-nodes may be moved between the DUs without inter-gNB procedures between the IAB donors.

Figure 2:
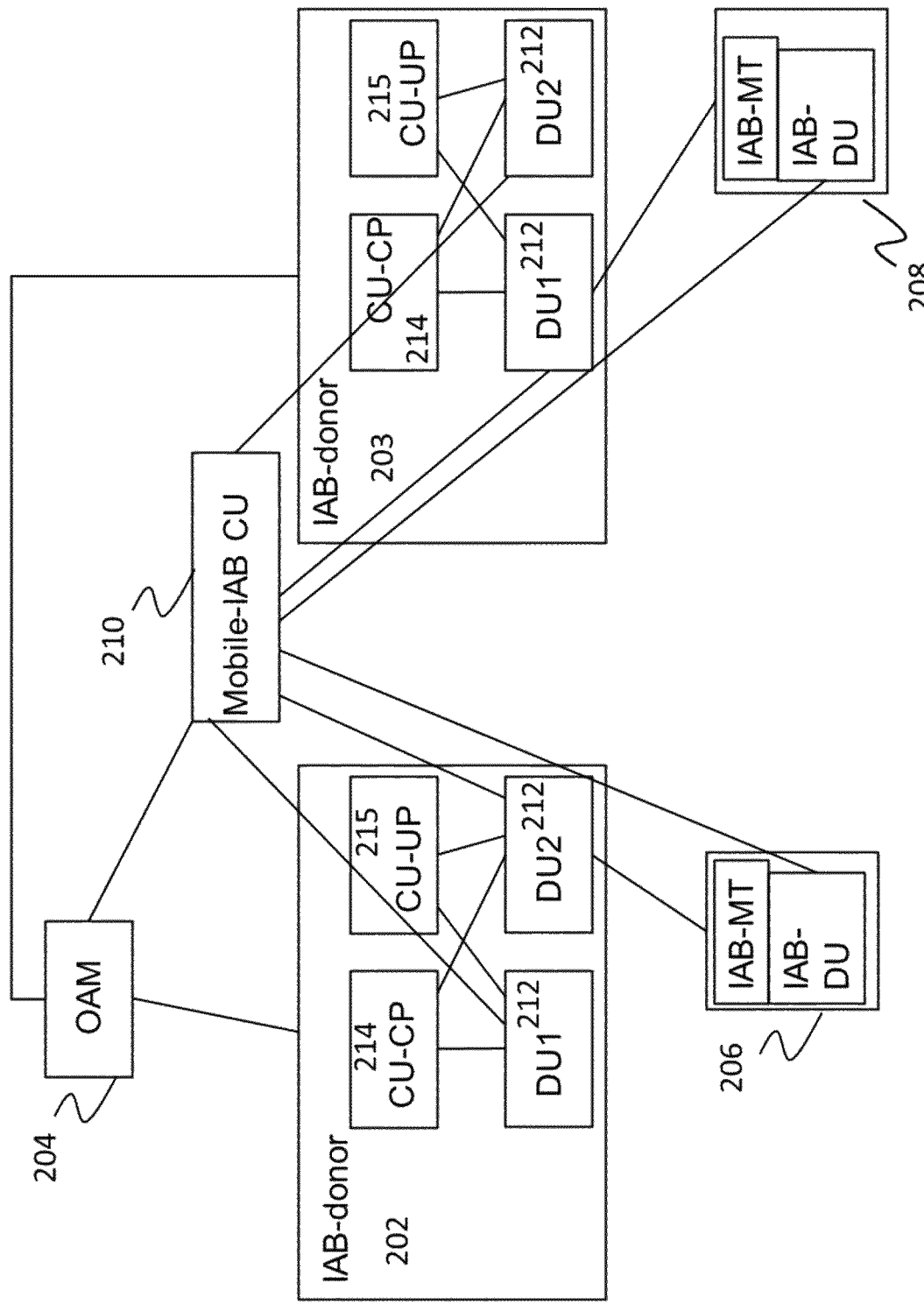
FIG. 2 illustrates an example architecture for a radio access network for supporting mobile self-backhauling wireless access nodes in accordance with at least some embodiments of the present invention.

FIG. 2 illustrates an example architecture for a radio access network for supporting mobile self-backhauling wireless access nodes in accordance with at least some embodiments of the present invention.

The radio access network comprises one or more Mobile IAB-nodes 206, 208 that may be connected to IAB-donors 202, 203. A Mobile IAB-node 206, 208 hosts a Mobile Termination (MT), i.e. IAB-MT, and a DU, i.e. IAB-DU. The IAB-MT maintains a wireless backhaul towards an IAB-donor. The IAB-DU provides an access connection to the UEs or a downstream MT of other IAB-nodes. The IAB-donors comprise distributed units (DUs) 212, i.e. IAB-donor-DUs, and centralized units (CUs), i.e. IAB-donor-CUs. A CU, e.g. IAB-donor-CU, IAB-CU or Mobile-IAB-CU, may comprise a CU-control plane 214 (CU-CP) and a CU-user plane 215 (CU-UP). The CU-CP is a logical node configured to host a control plane and the CU-UP is a logical node configured to host a user plane. The control plane may terminate Radio Resource Control (RRC) connections of the Mobile IAB-nodes. Accordingly, the CU-CP is configured to serve control plane traffic and the CU-UP is configured serve user plane traffic. The CU-CP is connected over F1-C interface with one or more DUs. The CU-UP is connected over F1-U interface with one or more DUs. A controller node, i.e. a Mobile-IAB CU 210, may be connected to IAB-donor-DUs and Mobile IAB-node-DUs. The DUs 212 may be deployed to a plurality of service areas of the radio access network. The service areas may comprise tracking areas and/or cells. Accordingly, the service areas of the DUs of the IAB-donors are geographically fixed and different DUs may be deployed to different tracking areas and/or cells. An OAM system 204 may be connected to the IAB-donors and the Mobile-IAB CU for configuring the IAB-donors, IAB-donor-DUs, IAB-donor-CUs and Mobile-IAB CU to support mobile self-backhauling wireless access nodes. In accordance with at least some embodiments, the Mobile-IAB CU may be connected to the IAB-donor-DUs 212 over F1 interface connections. In this way the Mobile-IAB CU 210 may serve for an IAB-CU of the IAB-donor-DUs 212 for supporting mobility of the Mobile IAB-nodes. In this way multi-homing of the IAB-donor-DUs may be provided, where the IAB-donor-DUs support termination of radio resource control connections both to the IAB-donor-CU and to the Mobile-IAB CU. User plane and control plane traffic may be served at the node, IAB-donor-CU or the Mobile-IAB CU, terminating the radio resource connection.

Figure 3:
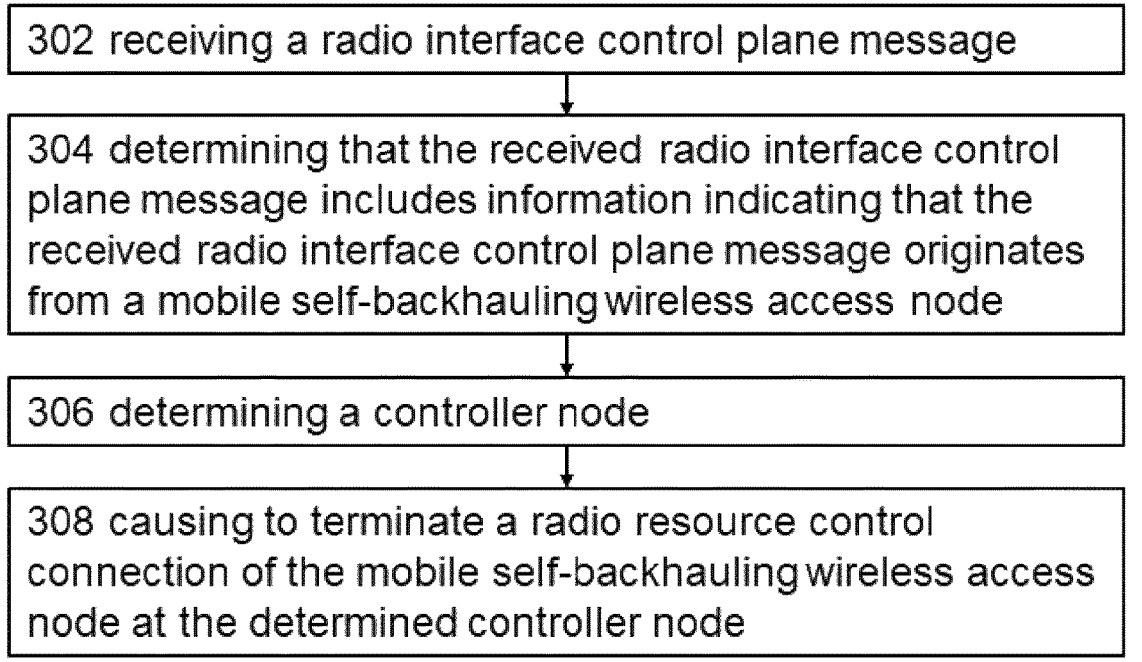

Referring to FIG. 3, there is provided a method for supporting mobile self-backhauling wireless access nodes. The method may be performed by a DU or a CU of a radio access node, for example an IAB-donor-DU or an IAB-donor-CU described with FIG. 2.

Phase 302 comprises receiving, at a distributed unit or a centralized unit of a radio access node configured to support self-backhauling wireless access nodes, a radio interface control plane message for establishing a radio resource control connection.

Phase 304 comprises determining, at the distributed unit or centralized unit, that the received radio interface control plane message includes information indicating that the received radio interface control plane message originates from a mobile self-backhauling wireless access node.

Phase 306 comprises determining, at the distributed unit or the centralized unit, a controller node configured to: serve for a centralized unit of distributed units of different radio access nodes, and connect to distributed units deployed to a plurality of service areas of the radio access network.

Phase 308 comprises causing, at the distributed unit or the centralized unit, to terminate a radio resource control connection of the mobile self-backhauling wireless access node at the determined controller node.

In an example phase 302 comprises that the radio interface control plane message may be a control plane message associated with an establishment procedure of a radio resource control connection. Examples of the messages associated with an establishment procedure of a radio resource control connection comprise at least a radio resource control configuration request, radio resource control re-configuration request and a radio resource control connection complete message.

In an example phase 302 comprises that the radio interface control plane message may be a message associated with a Non-Access Stratum (NAS) procedure of a UE or a part of a UE, for example an T. Examples of the NAS procedures comprise at least a registration procedure. In an example, the radio interface control plane message comprises a radio resource control protocol message encapsulating a NAS message.

In an, example in accordance with at least some embodiments, phase 302 comprises that the radio interface control plane message may be in accordance with a radio interface protocol for a control plane connection and includes an indicator for indicating that the received radio interface control plane message originates from a mobile self-backhauling wireless access node. Examples of the indicator comprise a group membership, an information element and any information capable of indicating that the received radio interface control plane message originates from a mobile self-backhauling wireless access node. In an example in accordance with at least some embodiments, the indicator may indicate a group membership of the of the mobile self-backhauling wireless access node. Accordingly, the indicator may be a group membership, whereby the indicator indicates that the received radio interface control plane message originates from a mobile self-backhauling wireless access node and also a group of the mobile self-backhauling wireless access node. Examples of the radio interface protocols for a control plane connection comprise protocols of a control plane protocol stack on a radio interface between a radio access network and a node holding a subscription to the radio access network. The protocol stack may comprise one or more of Backhaul Adaptation Protocol (BAP), a Packet Data Convergence Protocol (PDCP), a Radio Resource Control (RRC) protocol, Radio Link Control (RLC) Protocol or a Medium Access Control (MAC) protocol. The node holding a subscription to the radio access network may be a UE or a part of a UE, for example a mobile termination (MT). Examples of the indicator comprise an information element of a radio interface protocol and an information element encapsulated to a radio interface protocol message. Information elements encapsulated to a given radio interface protocol message may be from a higher protocol layer and/or associated with a NAS procedure between a UE or a part of a UE, for example an MT. The group membership facilitates determining that the mobile self-backhauling wireless access node belongs to a group of Mobile IAB-nodes. Examples of the groups comprise at least non-mobile self-backhauling wireless access nodes and mobile self-backhauling wireless access nodes. It should be noted that there may be more than one group of mobile self-backhauling wireless access nodes, whereby radio resource control connections of mobile self-backhauling wireless access nodes may be terminated to controller nodes dedicated for each group. In an example, the mobile self-backhauling wireless access nodes may be assigned to groups based on which trains the mobile self-backhauling wireless access nodes are deployed to.

In an example phase 302 comprises that the radio interface control plane message comprises a Mobile IAB Indication that indicates that the radio interface control plane message originates from a Mobile IAB-node. The Mobile IAB Indication may further indicate a group membership of the Mobile IAB-node. The group membership may indicate that the Mobile IAB-node belongs to a group of Mobile IAB-nodes. The group membership facilitates identifying the Mobile IAB-nodes. It should be noted that there may be more than one group of Mobile IAB-nodes, whereby the group membership facilitates identifying, which group a Mobile IAB-node belongs to. In this way, Mobile IAB-nodes of each group may be served by a Mobile-IAB CU dedicated to the group.

In an example phase 306 comprises determining a Mobile-IAB CU on the basis of an indication, for example a Mobile IAB Indication, included in the radio interface control plane message. Accordingly, the indication may be an RRC protocol information element.

In an example phase 306 comprises determining a Mobile-IAB CU on the basis of an indication, for example a Mobile IAB Indication, included in the radio interface control plane message. Accordingly, the indication may be an information element of a lower layer protocol, below RRC protocol in a radio interface protocol stack. The information element may be a Medium Access Control (MAC) protocol or a Radio Link Control (RLC) protocol information element.

In an example phase 306 comprises the radio interface control plane message comprising a group indication. The group indication may indicate a group. Examples of the groups comprise at least one of non-mobile self-backhauling wireless access nodes and mobile self-backhauling wireless access nodes. It should be noted that there may be more than one groups of non-mobile self-backhauling wireless access nodes and mobile self-backhauling wireless access nodes. The group indication may be for example a Mobile IAB Indication.

It should be noted that an indication, for example a Mobile IAB Indication, included in the radio interface control plane message, may sufficient for determining a Mobile-IAB CU, if there is only one Mobile-IAB CU for serving mobile self-backhauling wireless access nodes.

In an example phase 306 comprises determining that the message originates from a mobile self-backhauling wireless access node on the basis of a Non-access stratum (NAS) layer registration request received with the radio interface control plane message.

In an example phase 308 comprises supporting mobility of Mobile IAB-nodes by an IAB-donor-DU causing to terminate an RRC connection of a Mobile IAB-node at a Mobile-IAB CU.

In an example phase 308 comprises supporting mobility of Mobile IAB-nodes by an IAB-donor-CU causing to terminate an RRC connection of a Mobile IAB-node at a Mobile-IAB CU.

Figure 4:
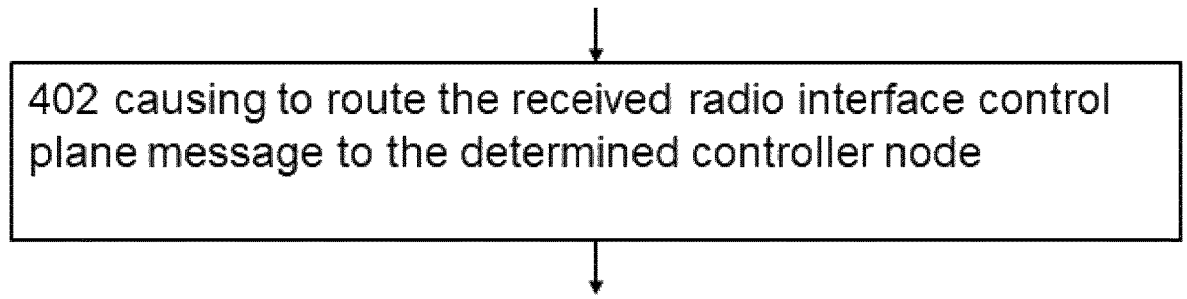

Referring to FIG. 4, there is provided a method for supporting mobility of mobile self-backhauling wireless access nodes. The method may be performed by a DU or a CU of a radio access node, for example an IAB-donor-DU or an IAB-donor-CU described with FIG. 2. The method may be performed in connection with one or more phases described with FIG. 3, e.g. in connection with phase 308.

Phase 402 comprises causing to route, at the distributed unit or the centralized unit, the received radio interface control plane message towards the determined controller node. In this way the terminating the radio resource control connection of the mobile self-backhauling wireless access node at the determined controller node may be facilitated.

In an example phase 402 comprises supporting mobility of Mobile IAB-nodes by an IAB-donor-DU causing to terminate an RRC connection of a Mobile IAB-node at a Mobile-IAB CU.

In an example phase 402 comprises supporting mobility of Mobile IAB-nodes by an IAB-donor-CU causing to terminate an RRC connection of a Mobile IAB-node at a Mobile-IAB CU.

Referring to FIG. 5, there is provided a method for supporting mobile self-backhauling wireless access nodes. The method may be performed by a DU or a CU of a radio access node, for example an IAB-donor-DU or an IAB-donor-CU described with FIG. 2. The method may be performed in connection with one or more phases described with FIG. 3, e.g. in connection with phase 308.

Phase 502 comprises causing, at the distributed unit or the centralized unit, establishment of one or more backhaul channels with the controller node for serving both control plane and user plane traffic to/from the mobile self-backhauling wireless access node at the controller node. In this way mobility of mobile self-backhauling wireless access nodes between DUs controlled by the controller node may be supported.

In an example phase 502 comprises that the backhaul channels are established with the controller node on the basis of checking subscription data of the mobile self-backhauling wireless access node originating the radio interface control plane message. The controller node may receive from a core network node, for example an AMF, information indicating that subscription of the mobile self-backhauling wireless access node is valid. Therefore, the controller node may proceed with establishing the backhaul channels.

In an example phase 502 comprises supporting mobility of Mobile IAB-nodes by an IAB-donor-CU causing to terminate an RRC connection of a Mobile IAB-node at a Mobile-IAB CU.

Referring to FIG. 6, there is provided a method for supporting mobility of mobile self-backhauling wireless access nodes. The method may be performed by a DU or a CU of a radio access node, for example an IAB-donor-DU or an IAB-donor-CU described with FIG. 2. The method may be performed in connection with one or more phases described with FIG. 3, e.g. before phase 302.

Phase 602 comprises receiving, at the distributed unit or the centralized unit of the radio access node, from a management system, a configuration for controlling the distributed unit by the controller node. The configuration facilitates terminating the radio resource control connection of the mobile self-backhauling wireless access node at the determined controller node and mobility of mobile self-backhauling wireless access nodes between IAB-donor-DUs controlled by the controller node may be supported.

In an example, phase 602 comprises generating system information on the basis of the received configuration. The system information may include information for identifying one or more service areas dedicated to mobile self-backhauling wireless access nodes or a group of mobile self-backhauling wireless access nodes. The system information may comprise synchronization signals for facilitating the mobile self-backhauling wireless access nodes to deduce PC's and a tracking area identifier consisting of a TAI and a PLMN ID.

In an example phase 602 comprises the configuration comprising one or more node physical cell identifiers (PC's) that are dedicated for mobile self-backhauling wireless access nodes. A PCI provides a way for the UE to synchronize with a cell. The PCIs may be allocated using a PCI prefix that indicates a PCI dedicated for mobile self-backhauling wireless access nodes. Alternatively or additionally, the dedicated PC's may be allocated based on one or more specific Primary Synchronization Signal (PSS) values, for example PSS=4. For backward compatibility, an operator may allocate one or more specific Secondary Synchronization Signal values under a certain PSS value for allocating dedicated PCIs for mobile self-backhauling wireless access nodes.

In an example phase 602 comprises the configuration comprising one or more identifiers (TAIs) that are dedicated for mobile self-backhauling wireless access nodes. A tracking area identifier may be used by UE to determine whether the UE should perform a mobility registration update and by a CU to identify cell(s) over which UE should be paged.

Referring to FIG. 7, there is provided a method for supporting mobility of mobile self-backhauling wireless access nodes. The method may be performed by a DU or a CU of a radio access node, for example an IAB-donor-DU or an IAB-donor-CU described with FIG. 2. The method may be performed in connection with one or more phases described with FIG. 3, e.g. before phase 302.

Phase 702 comprises receiving, at the distributed unit or the centralized unit of the radio access node, from a management system, information indicating one or more groups of self-backhauling wireless access nodes.

Phase 704 comprises determining, at the distributed unit or the centralized unit, that the received radio interface control plane message includes information indicating a group membership of the mobile self-backhauling wireless access node.

Phase 706 comprises determining, at the distributed unit or the centralized unit of the radio access node, the controller node from at least two controller nodes that are configured to control different groups of self-backhauling wireless access nodes, on the basis of the group membership of the mobile self-backhauling wireless access node. In this way a controller node dedicated for serving the mobile self-backhauling wireless access nodes may be determined. The dedicated controller node supports mobility of mobile self-backhauling wireless access nodes.

In an example in accordance with at least some embodiments, the groups comprise at least one of non-mobile self-backhauling wireless access nodes and mobile self-backhauling wireless access nodes.

In an example, phase 704 comprises that the information indicating one or more groups comprises a Mobile IAB Indication.

In an example, phase 704 comprises the mobile self-backhauling wireless access node declaring a group membership that allows specific handling in the radio access, including selection of a more optimal CU or a CU dedicated to the groups of self-backhauling wireless access nodes. The group membership may be declared in a radio interface control plane message received from the mobile self-backhauling wireless access node. In an example the group membership is declared by an indication, for example a Mobile IAB Indication, that is included to the radio interface control plane message. The group membership may be checked by a core network node, for example an AMF. If the AMF determines that the group membership indicates a controller node dedicated for mobile self-backhauling wireless access nodes, e.g. a Mobile IAB-CU, the mobile self-backhauling wireless access node may be provisioned with neighbor relationships associated with the group membership. Neighbor relationships may be for example established with cells that are candidate for handover. Examples of candidate cells for handover comprise at least cells that are hosted by DUs that support multi-homing. In an example scenario, the candidate cells may hosted by DUs on the same train or on the same moving platform hosting the mobile self-backhauling wireless access node.

Referring to FIG. 8, there is provided a method for supporting mobility of mobile self-backhauling wireless access nodes. The method may be performed by a DU or a CU of a radio access node, for example a donor DU or a donor CU described with FIG. 2. The method may be performed in connection with one or more phases described with FIG. 3, e.g. in connection with phase 308.

Phase 802 comprises causing, at the distributed unit or the centralized unit of the radio access node, terminating the radio resource control connection of the mobile self-backhauling wireless access node at the determined controller node, in response to receiving information indicating support by subscription data of the mobile self-backhauling wireless access node. In this way terminating the radio resource control connection by the controller node may be limited to mobile self-backhauling wireless access nodes, who hold a valid subscription. In other words, if a self-backhauling wireless access node is not subscribing to be handled as mobile, it will not be anchored to the mobile centralized unit.

Referring to FIG. 9, there is provided a method for supporting mobility of mobile self-backhauling wireless access nodes. The method may be performed by a management system for radio access nodes, for example the OAM in FIG. 2.

Phase 902 comprises configuring, by a management system, at least one controller node to serve for a centralized unit of distributed units of different radio access nodes deployed to a plurality of service areas of a radio access network.

Phase 904 comprises configuring, by the management system, the distributed units of different radio access nodes deployed to a plurality of service areas of the radio access network, to cause: terminating a radio resource control connection of at least one mobile self-backhauling wireless access node at the determined controller node.

In an example phase 902 comprises allocating the at least one controller one or more node physical cell identifiers (PCIs) that are dedicated for mobile self-backhauling wireless access nodes. The PCIS may be allocated using a PCI prefix that indicates a PCI dedicated for mobile self-backhauling wireless access nodes. Alternatively or additionally, the dedicated PCIS may be allocated based on one or more specific Primary Synchronization Signal (PSS) values, for example PSS=4. For backward compatibility, an operator may allocate one or more specific Secondary Synchronization Signal values under a certain PSS value for allocating dedicated PCIS for mobile self-backhauling wireless access nodes.

In an example phase 902 comprises allocating the at least one controller one or more tracking area identifiers (TAIs) that are dedicated for mobile self-backhauling wireless access nodes.

Referring to FIG. 10, there is provided a method for supporting mobility of mobile self-backhauling wireless access nodes. The method may be performed by a management system for radio access nodes, for example the OAM in FIG. 2.

Phase 1002 comprises configuring, by the management system, the distributed units of different radio access nodes deployed to a plurality of service areas of the radio access network, to cause: establishing backhaul channels between the distributed units of different radio access nodes and the controller node for serving both control plane and user plane traffic to/from the at least one mobile self-backhauling wireless access node at the controller node. In this way mobility of mobile self-backhauling wireless access nodes may be supported.

Referring to FIG. 11, there is provided a method for supporting mobility of mobile self-backhauling wireless access nodes. The method may be performed by a management system for radio access nodes, for example the OAM in FIG. 2.

Phase 1102 comprises assigning, by the management system, to the at least one controller node, one or more one or more identifiers for identifying service areas dedicated for mobile self-backhauling wireless access nodes. In this way mobile self-backhauling wireless access nodes and/or user equipment may identify services areas that are dedicated to the mobile self-backhauling wireless access nodes.

In an example the identifiers in phase 1102 comprise Physical Cell Identifiers (PCIS) and/or tracking area identifiers.

In an example phase 1102 comprises that the identifiers are specific to different groups of mobile self-backhauling wireless access nodes. In this way, service areas of different groups may be identified and selected by the mobile self-backhauling wireless access nodes based on a group membership. Examples of the groups comprise at least one of non-mobile self-backhauling wireless access nodes and mobile self-backhauling wireless access nodes. The mobile self-backhauling wireless access nodes may configure neighbor relationships within the same group identified by the group membership and avoid configuring neighbor relationships with radio access nodes, e.g. IAB-nodes, that do not belong to the same group. In this way the service areas may be dedicated to specific groups. In an example the service areas may be identified by PCIs that are dedicated to a group of mobile self-backhauling wireless access nodes, whereby configuring neighbor relationships with PCIs that belong to the same group of mobile self-backhauling wireless access nodes avoids collisions with PCIs with other groups.

Referring to FIG. 12, there is provided a method for supporting mobility of mobile self-backhauling wireless access nodes. The method may be performed by a management system.

Phase 1202 comprises configuring, by the management system, the distributed units of different radio access nodes deployed to a plurality of service areas of the radio access network, to cause terminating, the radio resource control connection of the at least one mobile self-backhauling wireless access node at the at least one controller node on the basis of a group membership of the at least one mobile self-backhauling wireless access node. In this way a group membership may be used to determine that a radio resource control connection is to be terminated at the controller node. For instance, mobile self-backhauling wireless access nodes hosted on a train line may have a different Mobile-IAB CU than the one used for those of another train line, as the trains travel over different paths.

Referring to FIG. 13, there is provided a method for supporting mobility of mobile self-backhauling wireless access nodes. The method may be performed by a management system.

Phase 1302 comprises configuring by the management system, the distributed units of different radio access nodes deployed to a plurality of service areas of the radio access network, to cause terminating, the radio resource control connection, at the at least one controller node, in response to receiving a radio interface control plane message for establishing a radio resource control connection, wherein the received radio interface control plane message includes information indicating that the received radio interface control plane message originates from the at least one mobile self-backhauling wireless access node. This allows identifying that a mobile self-backhauling wireless access node is mobile (e.g. it is hosted on a train) and benefits of the allocation of a Mobile-IAB CU, if available.

Figure 14:
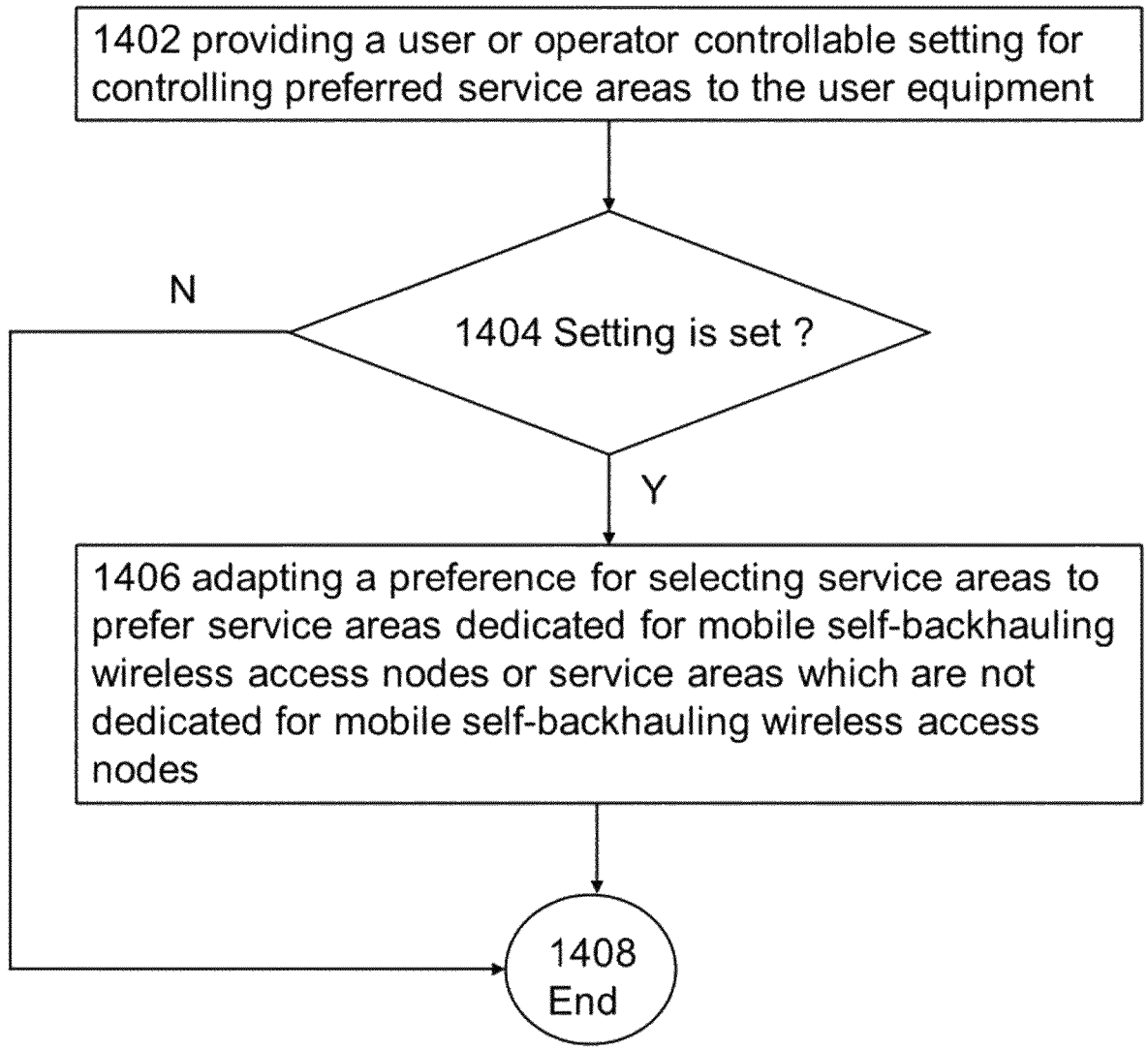

Referring to FIG. 14, there is provided a method for supporting mobile self-backhauling wireless access nodes by a user equipment. The method may be performed by a user equipment.

Phase 1402 comprises providing at the user equipment, a user or operator controllable setting for controlling preferred service areas to the user equipment.

Phase 1404 comprises determining whether the setting is set. If the user controllable setting has been set, the method proceeds from 1404 to 1406 comprising adapting a preference for selecting service areas to prefer service areas dedicated for mobile self-backhauling wireless access nodes or service areas which are not dedicated for mobile self-backhauling wireless access nodes. If the user controllable setting is not set, the method proceeds from 1404 to end at 1408. After phase 1406 the method ends at 1408 after the preference has been adapted as controlled by the user controllable setting.

In an example the user controllable setting may be set by a user of the user equipment via a user interface of the user equipment. On the other hand, an operator controllable setting may be set by the operator using a UE configuration method.

In an example, phase 1406 may comprise that the preference is adapted to allow selecting only services areas that are dedicated to mobile self-backhauling nodes. In another example phase 1406 may comprise that the preference is adapted to not to allow selecting services areas that are dedicated to mobile self-backhauling nodes.

Figure 15:
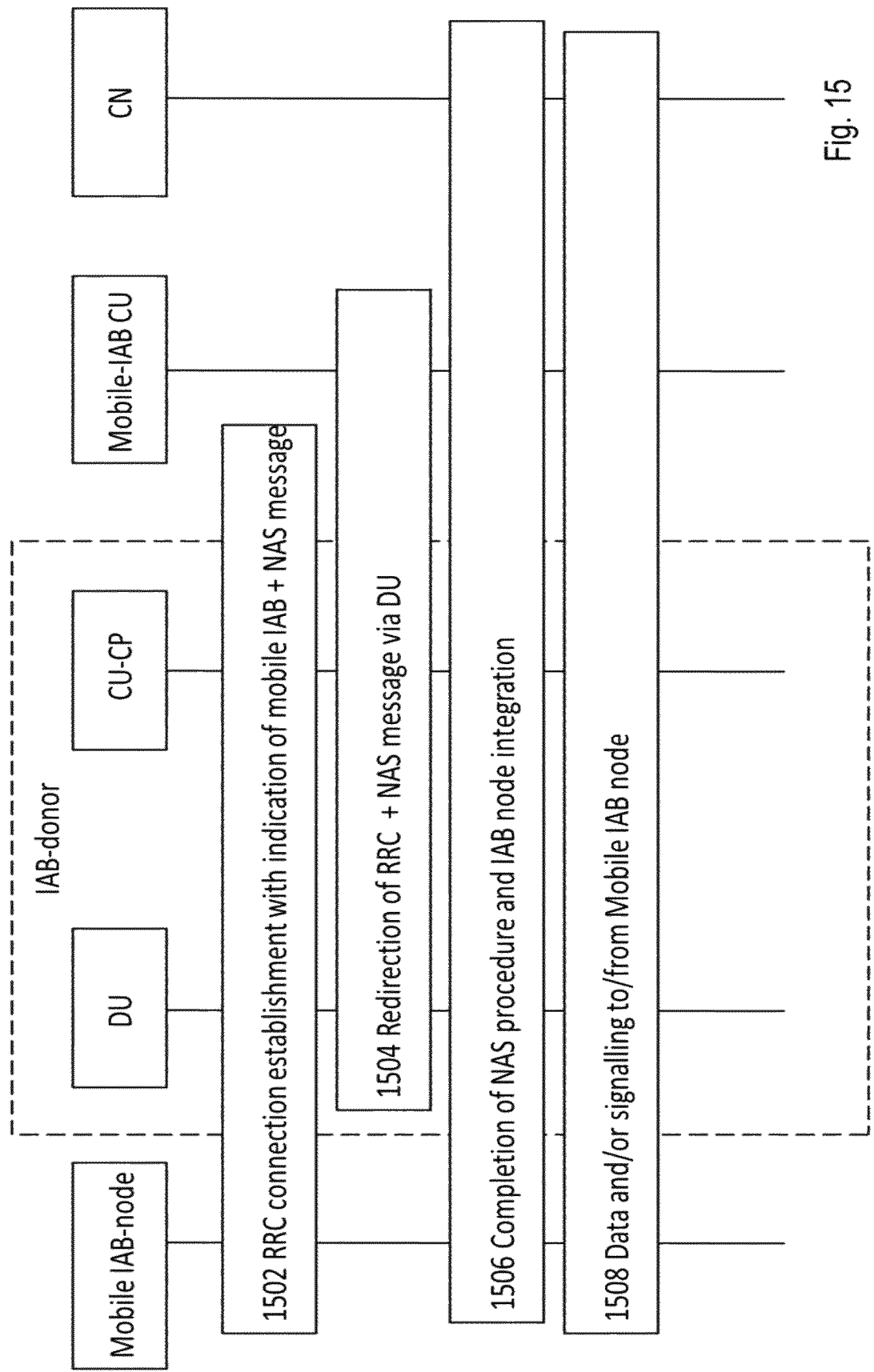
FIG. 15 illustrates an example of a sequence in accordance with at least some embodiments of the present invention.

FIG. 15 illustrates an example of a sequence in accordance with at least some embodiments of the present invention. The sequence supports mobility of Mobile IAB-nodes by an IAB-donor causing to terminate an RRC connection of a Mobile IAB-node at a Mobile-IAB CU.

Phase 1502 comprises a Mobile IAB-node transmitting an RRC connection establishment message, for example an RRC setup request or an RRC reconfiguration, with a Mobile IAB Indication. The Mobile IAB Indication may indicate a Mobile IAB-node. The RRC connection establishment message may include a non-access stratum (NAS) message. The RRC connection establishment message is received at the IAB-donor. Phase 1504 comprises, re-directing the RRC connection establishment message to a mobile-IAB CU. Accordingly, phase 1504 causes that an RRC connection establishment procedure associated with the RRC connection establishment message is not completed with the IAB-donor. The re-directing may be performed by an IAB-donor-DU or by the IAB-donor-CU-CP. Phase 1506 may comprise the mobile-IAB CU completing the RRC connection establishment based on the RRC connection establishment message, a NAS procedure associated with the NAS message and integrating the Mobile IAB-node with the Mobile-IAB CU. The Mobile IAB-node may be integrated by establishing the state in DU, CU and Mobile IAB-node and establishing a backhaul channel between the IAB-donor-DU and the Mobile-IAB CU for the Mobile IAB-node. Phase 1506 comprises establishing one or more backhaul channels with the controller node for serving at the Mobile-IAB CU both control plane and user plane traffic to/from the Mobile IAB-node.

Phase 1508 comprises communications of data and/or signaling between the Mobile IAB-node and the mobile IAB-CU over the backhaul channels established at phase 1506.

Figure 16:
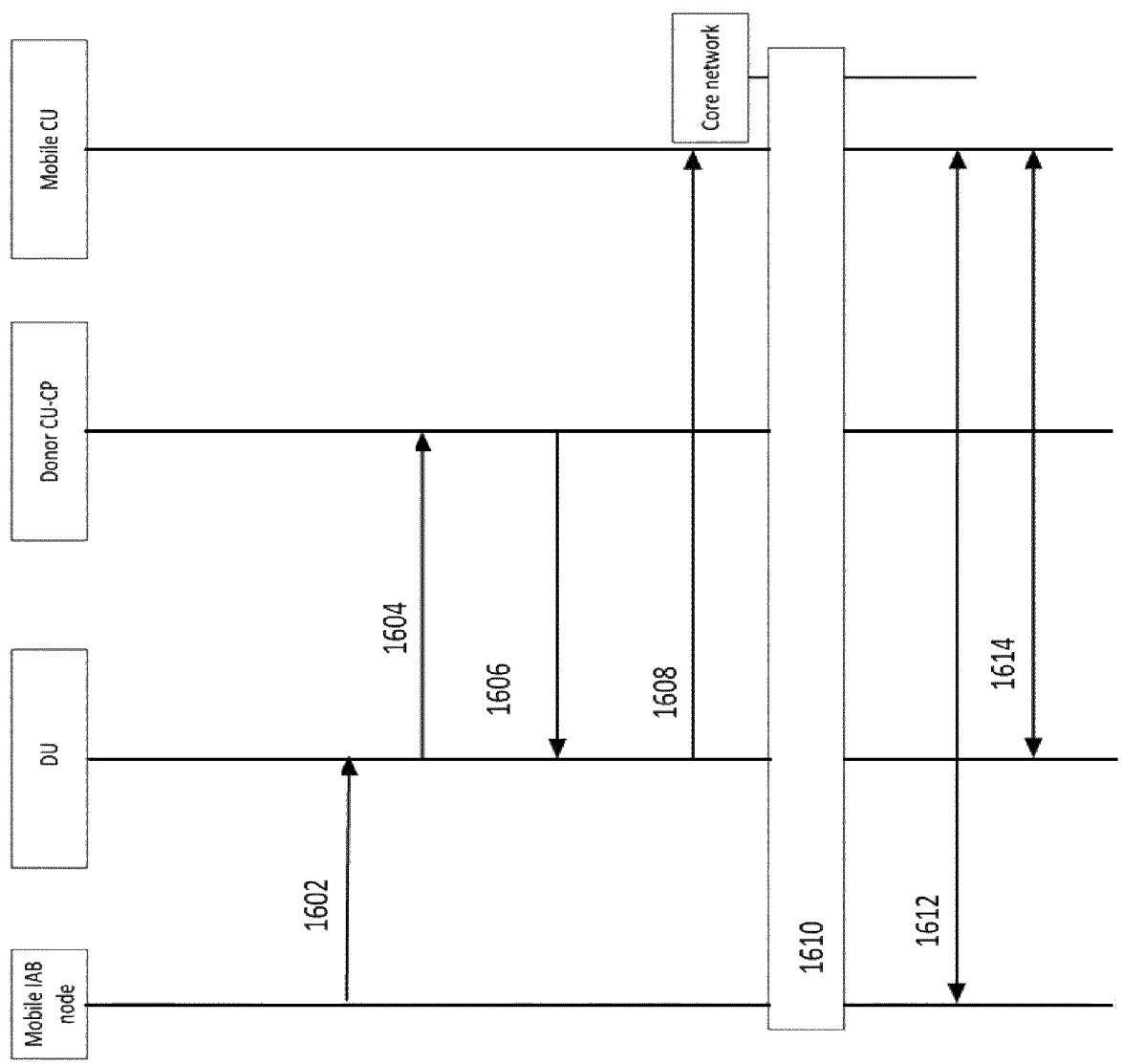
FIG. 16 illustrates an example of redirecting a radio interface control plane message by a centralized unit in accordance with at least some embodiments of the present invention.

FIG. 16 illustrates an example of a sequence in accordance with at least some embodiments of the present invention. The sequence supports mobility of Mobile IAB-nodes by an IAB-donor-CU causing to terminate an RRC connection of a Mobile IAB-node at a Mobile-IAB CU.

Phase 1602 comprises a Mobile IAB-node transmitting a radio interface control plane message, in this case an RRC Connection Setup Complete message, to an IAB-donor-DU. The RRC Connection Setup Complete message includes a Mobile IAB Indication for indicating that the RRC Connection Setup Complete message originates from a Mobile IAB-node. The Mobile IAB Indication may indicate a group membership of the Mobile IAB-node. In phase 1604, in response to the RRC Connection Setup Complete message, the IAB-donor-DU transmits an Initial UE RRC Message Transfer message concerning the message received from the Mobile IAB-node to an IAB-donor-CU-CP. In phase 1606, in response to the Initial UE RRC Message Transfer message, the IAB-donor-CU-CP causes terminating the RRC connection of the Mobile IAB at the Mobile-IAB CU by the IAB-donor-CU-CP transmitting DL UE RRC Message Redirect message concerning the RRC Connection Setup Complete message and the Mobile IAB-node. Accordingly, phase 1606 may comprise the IAB-donor-CU-CP determining on the basis of the Mobile Indication included in the UE RRC message Transfer that the RRC Connection Setup Complete message originates from a Mobile IAB-node. The IAB-donor-CU-CP may add an identifier, e.g. 5G Global Unique Temporary Identifier (5G-GUTI), of the Mobile IAB-node to the DL UE RRC Message Redirect message. Phase 1608 comprises the IAB-donor-DU transmitting an Initial UE RRC message Transfer concerning the message received from the Mobile IAB-node to the Mobile-CU and including an indication of the identifier of the Mobile IAB-node in response to the DL UE RRC Message Redirect message which includes the Mobile IAB Indication. The mobile IAB indication is enough to point to the Mobile CU as it is configured in the DU. Phase 1610 comprises completing registration of the Mobile IAB-node to the Core Network and validating the Mobile IAB-node to be served by the Mobile-IAB CU. The Mobile IAB-node may be validated by the CN on the basis of the Mobile IAB Indication indicating a group membership for the Mobile-IAB CU and subscription data of the Mobile IAB-node indicating the Mobile-IAB CU. Phase 1612 comprises the Mobile-IAB CU causing a reconfiguration of an RRC connection of the Mobile IAB-node for terminating an RRC connection of the Mobile IAB-node at the Mobile-IAB CU. Phase 1614 comprises the Mobile-IAB CU causing UE context modification including security establishment and protocol configuration of the Mobile IAB-node for establishing of one or more backhaul channels with the Mobile-IAB CU for serving both control plane and user plane traffic.

Figure 17:
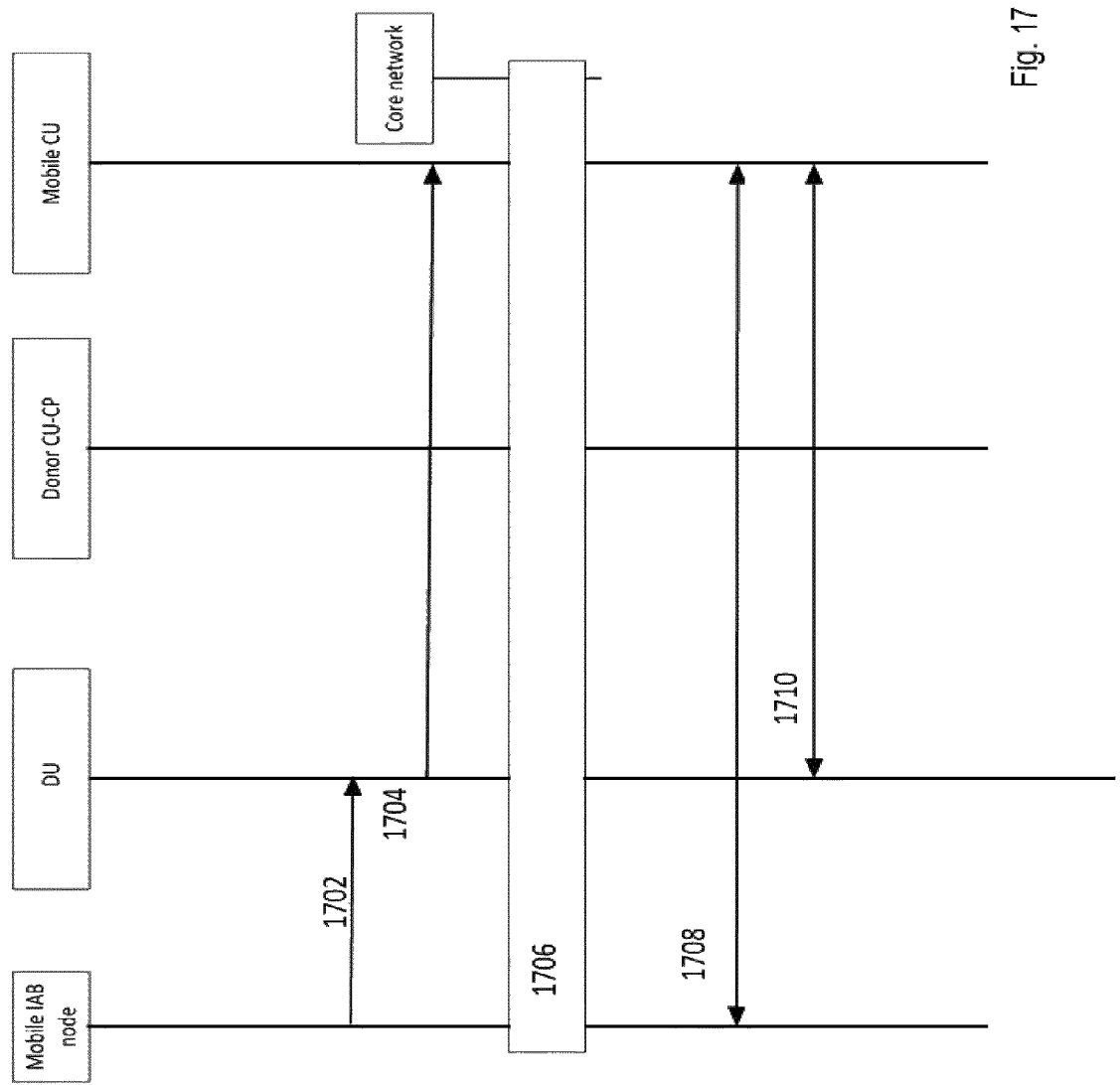
FIG. 17 illustrates an example of redirecting a radio interface control plane message by a distributed unit in accordance with at least some embodiments of the present invention.

FIG. 17 illustrates an example of a sequence in accordance with at least some embodiments of the present invention. The sequence supports mobility of Mobile IAB-nodes by an IAB-donor-DU causing to terminate an RRC connection of a Mobile IAB-node at a Mobile-IAB CU.

Phase 1702 comprises a Mobile IAB-node transmitting a radio interface control plane message, in this case an RRC Connection establishment message with a lower layer Mobile IAB Indication. The lower layer Mobile IAB Indication provides information indicating that the RRC Connection establishment message originates from a Mobile IAB-node. The lower layer Mobile IAB Indication may an indicator provided in an RLC layer information element. In phase 1704, in response to the RRC Connection establishment message with a lower layer AB-node indication, the IAB-donor-DU transmits an Initial UE RRC message Transfer message concerning the message received from the Mobile IAB-node to an IAB-donor-CU-CP. Accordingly, in phase 1704 the IAB-donor-DU may determine on the basis of the lower layer Mobile IAB Indication that the RRC Connection establishment message originates from a Mobile IAB-node. The Initial UE RRC message Transfer message from the DU to its CU includes a Mobile IAB indication. The Mobile IAB indication may be added to the RRC message Transfer message on the basis of the lower layer IAB-node indication. In phase 1706, the Mobile-IAB CU may cause completing registration of the Mobile IAB-node to the Core Network and validating the Mobile IAB-node to be served by the Mobile-IAB CU. The Mobile IAB-node may be validated by the CN on the basis of the Mobile IAB Indication and subscription data of the Mobile IAB-node. Phase 1708 comprises the Mobile-IAB CU causing a reconfiguration of an RRC connection of the Mobile IAB-node for terminating an RRC connection of the Mobile IAB-node at the Mobile-IAB CU. Phase 1710 comprises the Mobile-IAB CU causing UE context modification including security establishment and protocol configuration of the Mobile IAB-node for establishing of one or more backhaul channels with the Mobile-IAB CU for serving both control plane and user plane traffic.

Figure 18:
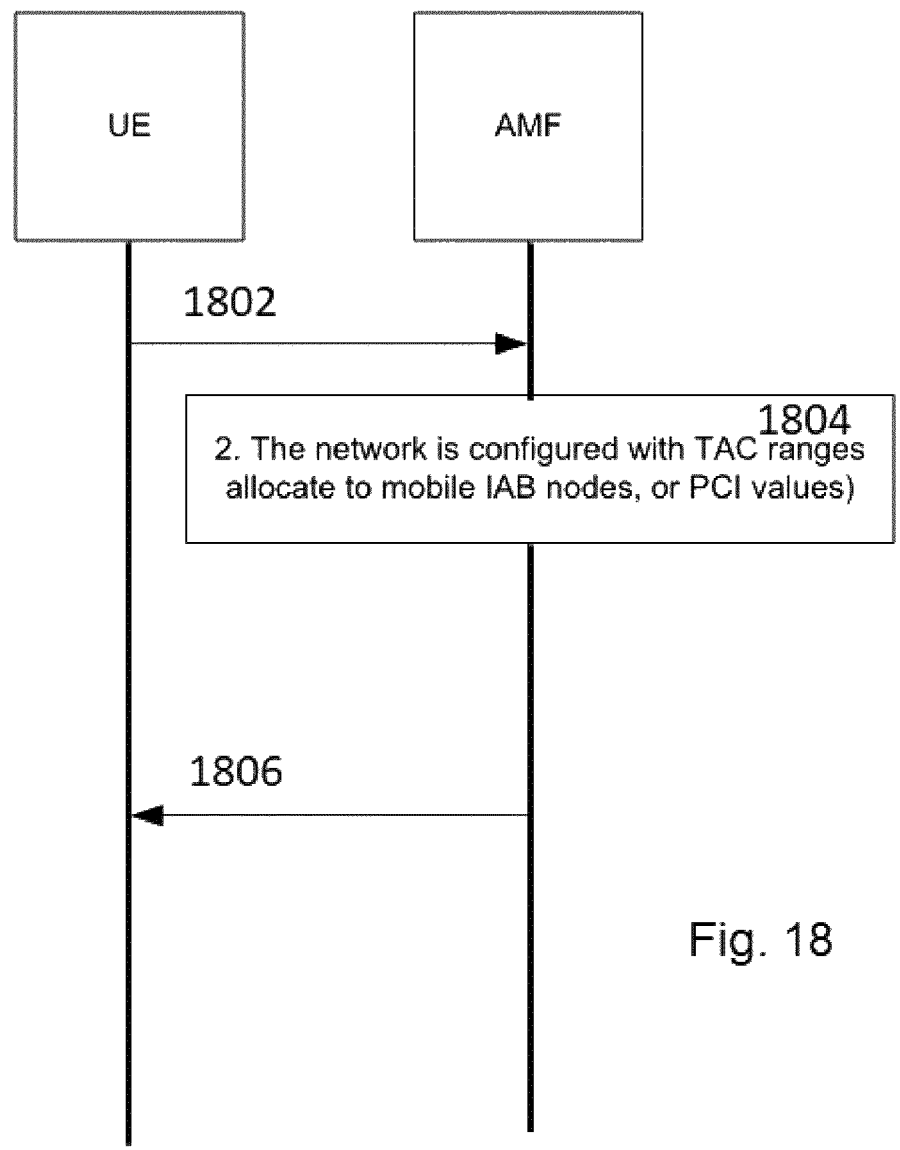
FIG. 18 illustrates an example of registering a mobile self-backhauling wireless access node to a communications network of the present invention.

FIG. 18 illustrates an example of a sequence in accordance with at least some embodiments of the present invention. The sequence supports presence of Mobile-IAB CUs in a communication network.

Phase 1802 comprise a UE transmitting a registration request to an AMF. Phase 1804 comprises, the AMF, in response to the registration request, determining to provide the UE information indicating services areas dedicated to Mobile-IAB CUs. Phase 1806 the AMF transmitting a registration ACCEPT message including the information indicating services areas dedicated to Mobile-IAB CUs. In this way the UE may obtain the services areas dedicated to Mobile-IAB CUs and determine whether services area dedicated to Mobile-IAB CUs are available and adapt a preference for selecting service areas dedicated to Mobile-IAB CUs. The adapting may be performed for example as described in phase 1406 of FIG. 14. In an example, phase 1804 comprises that the communication network is configured with tracking areas and/or PCI values dedicated to Mobile-IAB CUs, whereby the AMF may obtain the tracking areas and/or PCI values dedicated to Mobile-IAB CUs. Tracking areas for Mobile AB-nodes may be determined by a range of tracking area codes/tracking area identifiers that only Mobile IABnodes advertise on the system information.

In an example phase 1806 comprises the that the information indicating services areas comprises one or more criteria. Examples of the criteria comprise a mask to be applied on a TAI. The mask may be applied on a TAI to determine, whether the TAI is dedicated to Mobile IAB-nodes. Further examples of the criteria comprise specific values for a PCI prefix, a PSS value and an SSS under a specific PSS, which may be used to determine a PCI dedicated to Mobile IAB-nodes.

EXAMPLES

1. An apparatus comprising:
one or more processors, and memory storing instructions that, when executed by the one or more processors, the apparatus is caused to:
receive, at a distributed unit or a centralized unit of a radio access node configured to support self-backhauling wireless access nodes, a radio interface control plane message for establishing a radio resource control connection;
determine, at the distributed unit or centralized unit, that the received radio interface control plane message includes information indicating that the received radio interface control plane message originates from a mobile self-backhauling wireless access node;
determine, at the distributed unit or the centralized unit, a controller node configured to:
serve for a centralized unit of distributed units of different radio access nodes, and
connect to distributed units deployed to a plurality of service areas of the radio access network;
cause, at the distributed unit, to terminate a radio resource control connection of the mobile self-backhauling wireless access node at the determined controller node.

2. The apparatus according to example 1, the apparatus is caused to:
route, at the distributed unit or the centralized unit, the received radio interface control plane message to the determined controller node 3. The apparatus according to example 1 or 2, the apparatus is caused to:
establish, at the distributed unit or the centralized unit, one or more backhaul channels with the controller node for serving both control plane and user plane traffic to/from the mobile self-backhauling wireless access node at the controller node.

4. The apparatus according to any of examples 1 to 3, the apparatus is caused to:
receive, at the distributed unit or the centralized unit of the radio access node, from a management system, a configuration for controlling the distributed unit by the controller node 5. The apparatus according to any of examples 1 to 4, the apparatus is caused to:
receiving, at the distributed unit or the centralized unit of the radio access node, from a management system, information indicating one or more groups of self-backhauling wireless access nodes;
determining, at the distributed unit or the centralized unit, that the received radio interface control plane message includes information indicating a group membership of the mobile self-backhauling wireless access node; and
determining, at the distributed unit or the centralized unit of the radio access node, the controller node from at least two controller nodes that are configured to control different groups of self-backhauling wireless access nodes, on the basis of the group membership of the mobile self-backhauling wireless access node.

6. The apparatus according to example 5, wherein the groups comprise at least one of non-mobile self-backhauling wireless access nodes and mobile self-backhauling wireless access nodes.

7. The apparatus according to any of examples 1 to 6, the apparatus is caused to:
control, at the distributed unit or the centralized unit of the radio access node, the radio resource control connection of the mobile self-backhauling wireless access node, in response to receiving information indicating support by subscription data of the mobile self-backhauling wireless access node.

8. The apparatus according to any of examples 1 to 7, wherein the distributed units deployed to a plurality of service areas of the radio access network comprise distributed units deployed in one or more vehicles comprising at least one of road vehicles, vehicles running on rails, and aquatic vehicles.

9. The apparatus according to any of examples 1 to 8, wherein the radio interface control plane message is in accordance with a radio interface protocol for a control plane connection and the radio interface control plane message includes an indicator for indicating that the received radio interface control plane message originates from a mobile self-backhauling wireless access node.

10. The apparatus according to example 9, wherein the indicator indicates a group membership of the of the mobile self-backhauling wireless access node.

11. The apparatus according to any of examples 1 to 10, wherein a self-backhauling wireless access node is an Integrated Access and Backhaul, IAB, -node, and the radio access node is an Integrated Access and Backhaul, IAB, -donor node.

12. An apparatus comprising:
one or more processors, and memory storing instructions that, when executed by the one or more processors, the apparatus is caused to:
configure, by the management system, the distributed units of different radio access nodes deployed to a plurality of service areas of the radio access network, to cause:
controlling, by the at least one controller node, a radio resource control connection of at least one mobile self-backhauling wireless access node; and
establish backhaul channels with the controller node for serving both control plane and user plane traffic to/from the mobile self-backhauling wireless access node at the controller node.

13. The apparatus according to example 12, the apparatus is caused to:

configuring, by a management system, at least one controller node to serve for a centralized unit of distributed units of different radio access nodes deployed to a plurality of service areas of the radio access network;

configuring, by the management system, the distributed units of different radio access nodes deployed to a plurality of service areas of the radio access network, to cause:
  terminating a radio resource control connection of at least one mobile self-backhauling wireless access node at the determined controller node.

14. The apparatus according to example 12 or 13, the apparatus is caused to:
  configuring, by the management system, the distributed units of different radio access nodes deployed to a plurality of service areas of the radio access network, to cause:
    establishing backhaul channels between the distributed units of different radio access nodes and the controller node for serving both control plane and user plane traffic to/from the at least one mobile self-backhauling wireless access node at the controller node.

15. The apparatus according to any of examples 12 to 14, the apparatus is caused to:
  assigning, by the management system, to the at least one controller node, one or more one or more identifiers for identifying service areas dedicated for mobile self-backhauling wireless access nodes.

16. The apparatus according to any of examples 12 to 15, the apparatus is caused to:
  configuring, by the management system, the distributed units of different radio access nodes deployed to a plurality of service areas of the radio access network, to cause terminating, the radio resource control connection of the at least one mobile self-backhauling wireless access node at the at least one controller node on the basis of a group membership of the at least one mobile self-backhauling wireless access node.

17. The apparatus according to any of examples 12 to 16, wherein groups of the group memberships comprise at least one of non-mobile self-backhauling wireless access nodes and mobile self-backhauling wireless access nodes.

18. The apparatus according to any of examples 12 to 17, the apparatus is caused to:
  configuring by the management system, the distributed units of different radio access nodes deployed to a plurality of service areas of the radio access network, to cause terminating, the radio resource control connection, at the at least one controller node, in response to receiving a radio interface control plane message for establishing a radio resource control connection, wherein the received radio interface control plane message includes information indicating that the received radio interface control plane message originates from the at least one mobile self-backhauling wireless access node.

19. The apparatus according to any of examples 12 to 18, wherein the distributed units deployed to a plurality of service areas of the radio access network comprise distributed units deployed to one or more vehicles comprising at least one of road vehicles, vehicles running on rails, and aquatic vehicles.

20. The apparatus according to any of examples 12 to 19, wherein a self-backhauling wireless access node is an Integrated Access and Backhaul, IAB, -node, and the radio access node is an Integrated Access and Backhaul, IAB, -donor node.

21. An apparatus comprising:
  one or more processors, and memory storing instructions that, when executed by the one or more processors, the apparatus is caused to:
  provide at a user equipment, a user or operator controllable setting for controlling preferred service areas to the user equipment;
  adapt, at a user equipment, if the user or operator controllable setting is set, a preference for selecting service areas dedicated for mobile self-backhauling wireless access nodes or service areas which are not dedicated for mobile self-backhauling wireless access nodes.

22. The apparatus according to example 21, wherein a mobile self-backhauling wireless access node is an Integrated Access and Backhaul, IAB, -node, deployed on a platform configured to be movable between service areas of a radio access network.

23. A computer program comprising computer readable program code means adapted to perform at least the following:
  receiving, at a distributed unit or a centralized unit of a radio access node configured to support self-backhauling wireless access nodes, a radio interface control plane message for establishing a radio resource control connection;
  determining, at the distributed unit or centralized unit, that the received radio interface control plane message includes information indicating that the received radio interface control plane message originates from a mobile self-backhauling wireless access node;
  determining, at the distributed unit or the centralized unit, a controller node configured to:
    serve for a centralized unit of distributed units of different radio access nodes, and
    connect to distributed units deployed to a plurality of service areas of the radio access network;
  causing, at the distributed unit, to terminate a radio resource control connection of the mobile self-backhauling wireless access node at the determined controller node.

24. The computer program according to example 23, comprising computer readable program code means adapted to perform:
  causing to route, at the distributed unit or the centralized unit, the received radio interface control plane message to the determined controller node.

25. The computer program according to example 23 or 24, comprising computer readable program code means adapted to perform:
  causing, at the distributed unit or the centralized unit, establishment of one or more backhaul channels with the controller node for serving both control plane and user plane traffic to/from the mobile self-backhauling wireless access node at the controller node.

26. The computer program according to any of examples 23 to 25, comprising computer readable program code means adapted to perform:
  receiving, at the distributed unit or the centralized unit of the radio access node, from a management system, a configuration for controlling the distributed unit by the controller node.

27. The computer program according to any of examples 23 to 26, comprising computer readable program code means adapted to perform:
  receiving, at the distributed unit or the centralized unit of the radio access node, from a management system, information indicating one or more groups of self-backhauling wireless access nodes;

determining, at the distributed unit or the centralized unit, that the received radio interface control plane message includes information indicating a group membership of the mobile self-backhauling wireless access node; and determining, at the distributed unit or the centralized unit of the radio access node, the controller node from at least two controller nodes that are configured to control different groups of self-backhauling wireless access nodes, on the basis of the group membership of the mobile self-backhauling wireless access node.

28. The computer program according to example 27, wherein the groups comprise at least one of non-mobile self-backhauling wireless access nodes and mobile self-backhauling wireless access nodes.

29. The computer program according to any of examples 23 to 28, comprising computer readable program code means adapted to perform:

causing, at the distributed unit or the centralized unit of the radio access node, to terminate the radio resource control connection of the mobile self-backhauling wireless access node at the determined controller node, in response to receiving information indicating support by subscription data of the mobile self-backhauling wireless access node.

30. The computer program according to any of examples 23 to 29, wherein the distributed units deployed to a plurality of service areas of the radio access network comprise distributed units deployed in one or more vehicles comprising at least one of road vehicles, vehicles running on rails, and aquatic vehicles.

31. The computer program according to any of examples 23 to 30, wherein the radio interface control plane message is in accordance with a radio interface protocol for a control plane connection and the radio interface control plane message includes an indicator for indicating that the received radio interface control plane message originates from a mobile self-backhauling wireless access node.

32. The computer program according to example 31, wherein the indicator indicates a group membership of the of the mobile self-backhauling wireless access node.

33. The computer program according to any of examples 23 to 32, wherein a self-backhauling wireless access node is an Integrated Access and Backhaul, IAB, -node, and the radio access node is an Integrated Access and Backhaul, IAB, -donor node.

34. A computer program comprising computer readable program code means adapted to perform at least the following:

configuring, by the management system, the distributed units of different radio access nodes deployed to a plurality of service areas of the radio access network, to cause:

controlling, by the at least one controller node, a radio resource control connection of at least one mobile self-backhauling wireless access node; and establishing backhaul channels with the controller node for serving both control plane and user plane traffic to/from the mobile self-backhauling wireless access node at the controller node.

35. The computer program according to example 34, comprising computer readable program code means adapted to perform:

assigning, by the management system, to the at least one controller node, one or more one or more identifiers for identifying service areas dedicated for mobile self-backhauling wireless access nodes.

36. The computer program according to example 34 or 35, t comprising computer readable program code means adapted to perform:

configuring, by the management system, the distributed units of different radio access nodes deployed to a plurality of service areas of the radio access network, to cause terminating, the radio resource control connection of the at least one mobile self-backhauling wireless access node at the at least one controller node on the basis of a group membership of the at least one mobile self-backhauling wireless access node.

37. The computer program according to any of examples 34 to 36, wherein groups of the group memberships comprise at least one of non-mobile self-backhauling wireless access nodes and mobile self-backhauling wireless access nodes.

38. The computer program according to any of examples 34 to 37, comprising computer readable program code means adapted to perform:

configuring by the management system, the distributed units of different radio access nodes deployed to a plurality of service areas of the radio access network, to cause terminating, the radio resource control connection, at the at least one controller node, in response to receiving a radio interface control plane message for establishing a radio resource control connection, wherein the received radio interface control plane message includes information indicating that the received radio interface control plane message originates from the at least one mobile self-backhauling wireless access node.

39. The computer program according to any of examples 34 to 38 wherein the distributed units deployed to a plurality of service areas of the radio access network comprise distributed units deployed to one or more vehicles comprising at least one of road vehicles, vehicles running on rails, and aquatic vehicles.

40. The computer program according to any of examples 34 to 39, wherein a self-backhauling wireless access node is an Integrated Access and Backhaul, IAB, -node, and the radio access node is an Integrated Access and Backhaul, IAB, -donor node.

41. A computer program comprising computer readable program code means adapted to perform at least the following:

providing at a user equipment, a user or operator controllable setting for controlling preferred service areas to the user equipment;

adapting, at a user equipment, if the user or operator controllable setting is set, a preference for selecting service areas dedicated for mobile self-backhauling wireless access nodes or service areas which are not dedicated for mobile self-backhauling wireless access nodes.

42. The computer program according to example 41, wherein a mobile self-backhauling wireless access node is an Integrated Access and Backhaul, IAB, -node, deployed on a platform configured to be movable between service areas of a radio access network.

43. A non-transitory computer readable medium comprising program instructions stored thereon for performing at least the following:

receiving, at a distributed unit or a centralized unit of a radio access node configured to support self-backhauling wireless access nodes, a radio interface control plane message for establishing a radio resource control connection;

determining, at the distributed unit or centralized unit, that the received radio interface control plane message includes information indicating that the received radio interface control plane message originates from a mobile self-backhauling wireless access node;

determining, at the distributed unit or the centralized unit, a controller node configured to:
  serve for a centralized unit of distributed units of different radio access nodes, and
  connect to distributed units deployed to a plurality of service areas of the radio access network;

causing, at the distributed unit, to terminate a radio resource control connection of the mobile self-backhauling wireless access node at the determined controller node.

44. The non-transitory computer readable medium according to example 43, comprising program instructions stored thereon for performing:
  causing to route, at the distributed unit or the centralized unit, the received radio interface control plane message to the determined controller node.

45. The non-transitory computer readable medium according to example 43 or 44, comprising program instructions stored thereon for performing:
  causing, at the distributed unit or the centralized unit, establishment of one or more backhaul channels with the controller node for serving both control plane and user plane traffic to/from the mobile self-backhauling wireless access node at the controller node.

46. The non-transitory computer readable medium according to any of examples 43 to 45, comprising program instructions stored thereon for performing:
  receiving, at the distributed unit or the centralized unit of the radio access node, from a management system, a configuration for controlling the distributed unit by the controller node.

47. The non-transitory computer readable medium according to any of examples 43 to 46, comprising program instructions stored thereon for performing:
  receiving, at the distributed unit or the centralized unit of the radio access node, from a management system, information indicating one or more groups of self-backhauling wireless access nodes;
  determining, at the distributed unit or the centralized unit, that the received radio interface control plane message includes information indicating a group membership of the mobile self-backhauling wireless access node; and
  determining, at the distributed unit or the centralized unit of the radio access node, the controller node from at least two controller nodes that are configured to control different groups of self-backhauling wireless access nodes, on the basis of the group membership of the mobile self-backhauling wireless access node.

48. The non-transitory computer readable medium according to example 47, wherein the groups comprise at least one of non-mobile self-backhauling wireless access nodes and mobile self-backhauling wireless access nodes.

49. The non-transitory computer readable medium according to any of examples 43 to 48, comprising program instructions stored thereon for performing:
  causing, at the distributed unit or the centralized unit of the radio access node, to terminate the radio resource control connection of the mobile self-backhauling wireless access node at the determined controller node, in response to receiving information indicating support by subscription data of the mobile self-backhauling wireless access node.

50. The non-transitory computer readable medium according to any of examples 43 to 49, wherein the distributed units deployed to a plurality of service areas of the radio access network comprise distributed units deployed in one or more vehicles comprising at least one of road vehicles, vehicles running on rails, and aquatic vehicles.

51. The non-transitory computer readable medium according to any of examples 43 to 50, wherein the radio interface control plane message is in accordance with a radio interface protocol for a control plane connection and the radio interface control plane message includes an indicator for indicating that the received radio interface control plane message originates from a mobile self-backhauling wireless access node.

52. The non-transitory computer readable medium according to example 51, wherein the indicator indicates a group membership of the of the mobile self-backhauling wireless access node.

53. The non-transitory computer readable medium according to any of examples 43 to 52, wherein a self-backhauling wireless access node is an Integrated Access and Backhaul, IAB, -node, and the radio access node is an Integrated Access and Backhaul, IAB, -donor node.

54. A non-transitory computer readable medium comprising program instructions stored thereon for performing at least the following:
  configuring, by a management system, at least one controller node to serve for a centralized unit of distributed units of different radio access nodes deployed to a plurality of service areas of the radio access network;
  configuring, by the management system, the distributed units of different radio access nodes deployed to a plurality of service areas of the radio access network, to cause:
    controlling, by the at least one controller node, a radio resource control connection of at least one mobile self-backhauling wireless access node; and
    establishing backhaul channels with the controller node for serving both control plane and user plane traffic to/from the mobile self-backhauling wireless access node at the controller node.

55. The non-transitory computer readable medium according to example 54, comprising program instructions stored thereon for performing:
  configuring, by the management system, the distributed units of different radio access nodes deployed to a plurality of service areas of the radio access network, to cause:
    establishing backhaul channels between the distributed units of different radio access nodes and the controller node for serving both control plane and user plane traffic to/from the at least one mobile self-backhauling wireless access node at the controller node.

56. The non-transitory computer readable medium according to example 54 or 55, comprising program instructions stored thereon for performing:
  assigning, by the management system, to the at least one controller node, one or more one or more identifiers for identifying service areas dedicated for mobile self-backhauling wireless access nodes.

57. The non-transitory computer readable medium according to any of examples 54 to 56, comprising program instructions stored thereon for performing:

configuring, by the management system, the distributed units of different radio access nodes deployed to a plurality of service areas of the radio access network, to cause terminating, the radio resource control connection of the at least one mobile self-backhauling wireless access node at the at least one controller node on the basis of a group membership of the at least one mobile self-backhauling wireless access node.

58. The non-transitory computer readable medium according to any of examples 54 to 57, wherein groups of the group memberships comprise at least one of non-mobile self-backhauling wireless access nodes and mobile self-backhauling wireless access nodes.

59. The non-transitory computer readable medium according to any of examples 54 to 58, comprising program instructions stored thereon for performing:

configuring by the management system, the distributed units of different radio access nodes deployed to a plurality of service areas of the radio access network, to cause terminating, the radio resource control connection, at the at least one controller node, in response to receiving a radio interface control plane message for establishing a radio resource control connection, wherein the received radio interface control plane message includes information indicating that the received radio interface control plane message originates from the at least one mobile self-backhauling wireless access node.

60. The non-transitory computer readable medium according to any of examples 54 to 59, wherein the distributed units deployed to a plurality of service areas of the radio access network comprise distributed units deployed to one or more vehicles comprising at least one of road vehicles, vehicles running on rails, and aquatic vehicles.

61. The non-transitory computer readable medium according to any of examples 54 to 60, wherein a self-backhauling wireless access node is an Integrated Access and Backhaul, IAB, -node, and the radio access node is an Integrated Access and Backhaul, IAB, -donor node.

62. A non-transitory computer readable medium comprising program instructions stored thereon for performing at least the following:

providing at a user equipment, a user or operator controllable setting for controlling preferred service areas to the user equipment;

adapting, at a user equipment, if the user or operator controllable setting is set, a preference for selecting service areas dedicated for mobile self-backhauling wireless access nodes or service areas which are not dedicated for mobile self-backhauling wireless access nodes.

63. The non-transitory computer readable medium according to example 62, wherein a mobile self-backhauling wireless access node is an Integrated Access and Backhaul, IAB, -node, deployed on a platform configured to be movable between service areas of a radio access network.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application the term "circuitry" may refer to one or more or all of the following:
(a) hardware-only circuit implementations (such as implementations in only analogue and/or digital circuitry) and
(b) combinations of hardware circuits and software, such as (as applicable):)
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
I hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Figure 19:
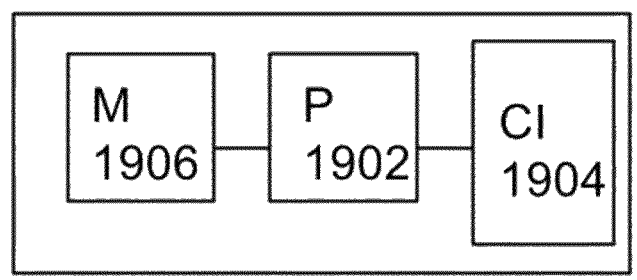
FIG. 19 illustrates an apparatus according to at least some embodiments of the present invention.

FIG. 19 illustrates an example of an apparatus in accordance with at least some embodiments of the present invention. The apparatus may be a radio access node, a base station, gNB, a user equipment, a core network node, an Access and Mobility Management Function, a management system, an OAM system, or a part or module therefore, such as a centralized unit or a distributed unit, of a radio access node, a base station or gNB.

The apparatus comprises a processor (P) 1902 and a communications interface (CI) 1904. The processor is operatively connected to the communications interface for controlling the communications interface. The apparatus may comprise a memory (M) 1906. The memory may be operatively connected to the processor. It should be appreciated that the memory may be a separate memory or included to the processor and/or the CI. The CI may be a transceiver or connected to a transceiver or at least capable of being connected to a transceiver.

According to an embodiment, the processor is configured to control the transceiver and/or to perform one or more functionalities described according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a radio access node or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a radio station, in a user radio device, in a computer such as a desktop computer or a tablet computer comprising radio frequency communication means (e.g. wireless local area network, cellular radio, etc.).

The invention claimed is:

1. An apparatus, comprising:
at least one processor; and
at least one non-transitory memory storing instructions that, when executed with the at least one processor, cause the apparatus to perform:
receiving, at a distributed unit or a centralized unit of a radio access node configured to support self-backhauling wireless access nodes, a radio interface control plane message for establishing a radio resource control connection;
determining, at the distributed unit or the centralized unit, that the received radio interface control plane message includes information indicating that the received radio interface control plane message originates from a mobile self-backhauling wireless access node;
receiving, at the distributed unit or the centralized unit of the radio access node, from a management system, information indicating one or more groups of self-backhauling wireless access nodes;
determining, at the distributed unit or the centralized unit, that the received radio interface control plane message includes information indicating a group membership of the mobile self-backhauling wireless access node; and
determining, at the distributed unit or the centralized unit of the radio access node, the controller node from at least two controller nodes that are configured to control different groups of self-backhauling wireless access nodes, on a basis of the group membership of the mobile self-backhauling wireless access node,
determining, at the distributed unit or the centralized unit, a controller node configured to:
serve for a centralized unit of distributed units of different radio access nodes, and
connect to distributed units deployed to a plurality of service areas of a radio access network;
causing, at the distributed unit, to terminate a radio resource control connection of the mobile self-backhauling wireless access node at the determined controller node.

2. The apparatus according to claim 1, wherein the instructions, when executed with the at least one processor, cause the apparatus to route, at the distributed unit or the centralized unit, the received radio interface control plane message to the determined controller node.

3. The apparatus according to claim 1, wherein the instructions, when executed with the at least one processor, cause, at the distributed unit or the centralized unit, establishment of one or more backhaul channels with the controller node for serving control plane and user plane traffic to the mobile self-backhauling wireless access node at the controller node and from the mobile self-backhauling wireless access node at the controller node.

4. The apparatus according to claim 1, wherein the instructions, when executed with the at least one processor, cause the apparatus to perform receiving, at the distributed unit or the centralized unit of the radio access node, from a management system, a configuration for controlling the distributed unit with the controller node.

5. The apparatus according to claim 1, wherein the self-backhauling wireless access node is an integrated access and backhaul node and the radio access node is an integrated access and backhaul donor node.

6. The apparatus according to claim 1, wherein the groups comprise at least one of non-mobile self-backhauling wireless access nodes or mobile self-backhauling wireless access nodes.

7. The apparatus according to claim 1, wherein the instructions, when executed with the at least one processor, cause the apparatus to perform causing, at the distributed unit or the centralized unit of the radio access node, to terminate the radio resource control connection of the mobile self-backhauling wireless access node at the determined controller node, in response to receiving information indicating support with subscription data of the mobile self-backhauling wireless access node.

8. The apparatus according to claim 1, wherein the distributed units deployed to a plurality of service areas of the radio access network comprise distributed units deployed in one or more vehicles comprising at least one of road vehicles, vehicles running on rails, or aquatic vehicles.

9. The apparatus according to claim 1, wherein a self-backhauling wireless access node is an integrated access and backhaul node and the radio access node is an integrated access and backhaul donor node.

10. An apparatus, comprising:
at least one processor; and at least one non-transitory memory storing instructions that, when executed with the at least one processor, cause the apparatus to perform:

configuring, with a management system, at least one controller node to serve for a centralized unit of distributed units of different radio access nodes deployed to a plurality of service areas of a radio access network;

configuring, with the management system, the distributed units of different radio access nodes deployed to a plurality of service areas of the radio access network, to cause terminating, the radio resource control connection of the at least one mobile self-backhauling wireless access node at the at least one controller node on the basis of a group membership of the at least one mobile self-backhauling wireless access node, configuring, with the management system, the distributed units of different radio access nodes deployed to a plurality of service areas of the radio access network, to cause:

terminating a radio resource control connection of at least one mobile self-backhauling wireless access node at the determined controller node.

11. The apparatus according to claim 10, wherein the instructions, when executed with the at least one processor, cause the apparatus to perform configuring, with the management system, the distributed units of different radio access nodes deployed to a plurality of service areas of the radio access network, to cause:

establishing backhaul channels between the distributed units of different radio access nodes and the controller node for serving control plane and user plane traffic to the at least one mobile self-backhauling wireless access node at the controller node and from the at least one mobile self-backhauling wireless access node at the controller node.

12. The apparatus according to claim 10, wherein the instructions, when executed with the at least one processor, cause the apparatus to perform assigning, with the management system, to the at least one controller node, one or more one or more identifiers for identifying service areas dedicated for mobile self-backhauling wireless access nodes.

13. The apparatus according to claim 10, wherein groups of the group memberships comprise at least one of non-mobile self-backhauling wireless access nodes or mobile self-backhauling wireless access nodes.

14. The apparatus according to claim 10, wherein the instructions, when executed with the at least one processor, cause the apparatus to perform configuring with the management system, the distributed units of different radio access nodes deployed to a plurality of service areas of the radio access network, to cause terminating, the radio resource control connection, at the at least one controller node, in response to receiving a radio interface control plane message for establishing a radio resource control connection, wherein the received radio interface control plane message includes information indicating that the received radio interface control plane message originates from the at least one mobile self-backhauling wireless access node.

15. The apparatus according to claim 10, wherein the distributed units deployed to a plurality of service areas of the radio access network comprise distributed units deployed to one or more vehicles comprising at least one of road vehicles, vehicles running on rails, or aquatic vehicles.

16. The apparatus according to claim 10, wherein a self-backhauling wireless access node is an integrated access and backhaul node and the radio access node is an integrated access and backhaul donor node.

* * * * *